United States Patent [19]

Tanaka

[11] 4,408,973

[45] Oct. 11, 1983

[54] INJECTION MOLDING MACHINE

[75] Inventor: Toshiaki Tanaka, Tokyo, Japan

[73] Assignee: The Sailor Pen Co., Ltd., Tokyo, Japan

[21] Appl. No.: 378,070

[22] Filed: May 14, 1982

[30] Foreign Application Priority Data

Jun. 4, 1981 [JP] Japan .............................. 56-81583[U]

[51] Int. Cl.³ .............................................. B29F 1/14
[52] U.S. Cl. .................................................. 425/139
[58] Field of Search ................................ 425/139, 556

[56] References Cited

U.S. PATENT DOCUMENTS 4,204,824  5/1980  Paradis ............................ 425/139 X
4,257,755  3/1981  Lemelson ....................... 264/243 X Primary Examiner—Thomas P. Pavelko
Attorney, Agent, or Firm—Frishauf, Holtz, Goodman and Woodward

[57] ABSTRACT

An injection molding machine includes a molding removal mechanism including a double-acting, fluid-operated cylinder which has a chuck mounted thereon for grasping a molded part, said cylinder being rapidly operated for removing the molded part from the mold and slowly actuated for transferring the molded part to a discharge position.

4 Claims, 3 Drawing Figures

INJECTION MOLDING MACHINE

BACKGROUND OF THE INVENTION

The present invention relates to an injection molding machine, and more particularly to an apparatus used in an injection molding machine for removing molded parts from the mold and discharging them onto a preselected unloading location.

There is known an injection molding machine including an apparatus for removing molded parts from the mold and discharging them onto a preselected unloading location which comprises a double-acting, fluid-operated cylinder having a piston rod and a chuck mechanism mounted on the piston rod, said chuck mechanism being adapted to be reciprocated by the fluid-operated cylinder twice per one cycle in which a molded part is removed and discharged. The double-acting, fluid-operated cylinder is actuated to reciprocate the chuck mechanism at the same speed at all times. It has been believed that the speed of the chuck mechanism must be increased as high as possible within the cycle in which an amount of molten resin material is injected and molded in the mold cavity after the latter has been closed. It is therefore customary that even when the cylinder is actuated to move the molded part grasped by the chuck mechanism to the unloading location, the chuck mechanism is moved at the same speed that it is moved to remove the molded part from the mold. This results in vibration upon discharging the molded part from the chuck mechanism so that the molded part will not exactly be placed on the unloading location.

It is therefore an object of the present invention to provide an improved molding removal and discharge apparatus which can rapidly remove a molded part from the mold and exactly and positively discharge the molded part onto a preselected unloading location with the desired attitude.

SUMMARY OF THE INVENTION

In accordance with the present invention, a double-acting, fluid-operated cyclinder is connected to a source of pressurized fluid through a control circuit which includes a directional control valve and a flow control valve connected in parallel with the directional control valve. The directional control valve is positioned to connect the cylinder directly to the source of pressurized fluid when the cylinder is to be actuated to remove a molded part from the mold. On the other hand, when the cylinder is to be actuated to discharge the molded part onto the unloading location, the directional control valve is positioned to connect the cylinder to the source of pressurized fluid through the flow control valve for providing a restricted flow of pressurized fluid to the cylinder. Consequently, the cylinder may be actuated to move the chuck mechanism at lower speed when the molded part is to be placed on the unloading location.

The present location will now be described by way of example with reference to the accompanying drawings.

DETAILED DESCRIPTION

Figure 1:
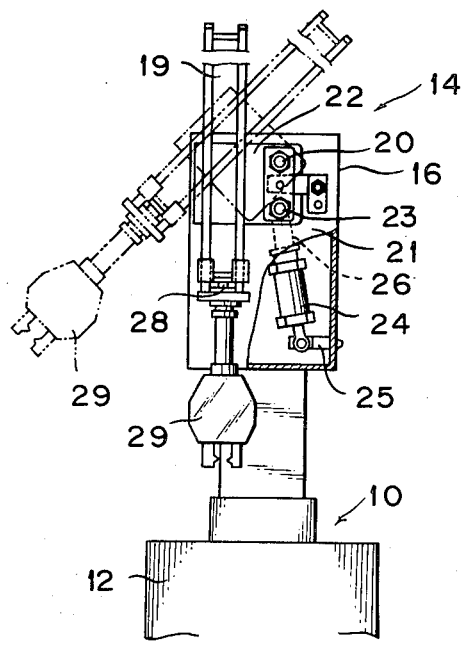
FIG. 1 is a schematic front elevation partly broken away of a molded-part removal and discharge apparatus according to the present invention.
Figure 2:
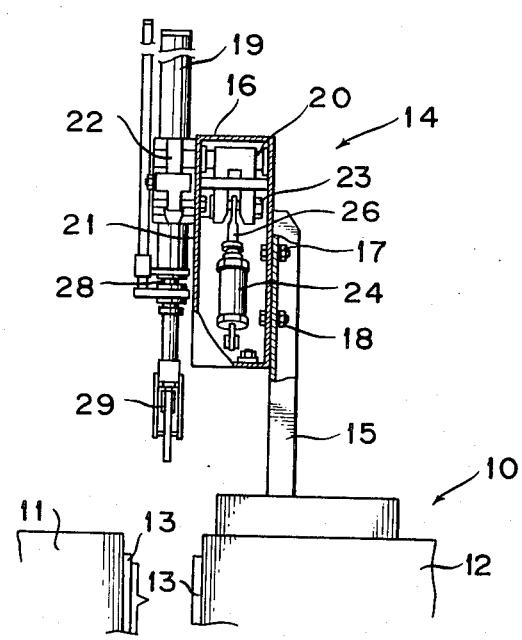
FIG. 2 is a side view partly broken away of the apparatus shown in FIG. 1.

Referring to FIGS. 1 and 2, there is shown an injection molding machine 10 including a movable portion 11 and a stationary portion 12. Each of these machine portions 11 and 12 supports a mold half 13 which is located oppositely to the mold half 13 of the other machine portion. When the mold halves 13 are closed against each other to form a mold cavity, a body of molten resin material is injected into the mold cavity to form a molded part in such a manner as is well known in the art.

A molded-part removal and discharge apparatus 14 according to the present invention is mounted on the stationary machine portion 12. The apparatus 14 comprises a supporting post 15 mounted vertically on the top of the stationary machine portion 12, a casing 16 mounted on the post 15 by any suitable means such as bolts 17 and nuts 18, and a swingable, double-acting, fluid-operated cylinder 19 attached to the casing 16 in a manner as described hereinafter.

The casing 16 includes a pivot shaft 20 rotatably supported by the casing 16 adjacent to the top thereof and extending within the casing parallel to a direction in which the mold cavity is open and closed. The pivot shaft 20 has an outer end projecting outwardly from the front wall 21 of the casing 16. A cylinder holder 22 is fixed to the outer end 21 of the pivot shaft 20 so that the holder 22 can be pivoted about the pivot shaft 20 as shown by broken line in FIG. 1. A shifting shaft 23 is connected to the cylinder holder 22 in a position spaced downwardly away from the pivot shaft 20 and extends parallel to the pivot shaft 20.

A double-acting fluid-operated cylinder 24 is located within the casing 22 with the lower end thereof being pivotably mounted on a bracket 25 which is fixed to the interior of the casing 22. The cylinder 24 includes a piston rod 26 slidably mounted therein with the upper end thereof being pivotably mounted on the pivot shaft 20. Accordingly, when the piston rod 26 of the cylinder 24 is extended outwardly under the action of pressurized fluid such as air, the cylinder holder 22 is pivoted to a position shown by the broken line in FIG. 1.

The cylinder holder 22 supports the double-acting, fluid-operated cylinder 19 which is vertically positioned when it is located in a position in which a molded part is to be removed from the mold cavity, as shown in FIG. 1. The cylinder 19 includes a piston rod 28 which is slidably mounted therein and adapted to reciprocate downwardly along the length of the cylinder 19. The piston rod 28 has a chuck mechanism 29 mounted thereon at the outer end for removing the molded part from the mold cavity. Since the chuck mechanism 29 is well known in the art, it will not further described herein. It may be sufficient to describe only the fact that when the cylinder 19 is in the vertical removal position shown by the solid line in FIG. 1 and the piston rod 28 is moved downwardly, the chuck mechanism 29 is moved to the mold cavity to grasp a molded part. When the piston rod 28 is retracted upwardly, the chuck mechanism 29 is moved upwardly with the molded part grasped. The chuck mechanism 29 is then shifted to a discharge position shown by the broken line in FIG. 1. Thereafter, the piston rod 28 is again extended so that the chuck mechanism 29 can place the grasped part on an unloading location (not shown).

Figure 3:
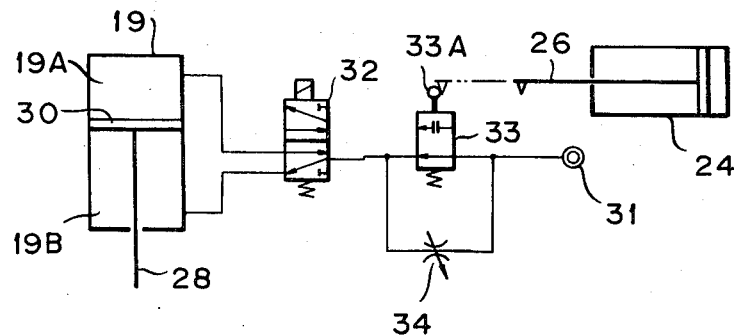
FIG. 3 is a circuit diagram of pressurized fluid used in the apparatus shown in FIGS. 1 and 2.

FIG. 3 shows a control circuit which can be used in the apparatus 14 shown in FIGS. 1 and 2. In the control circuit, the pressure chambers 19A and 19B of the cylinder 19 which are divided by a piston 30 are connected to a source of pressurized fluid (for example, air) 31 through a solenoid valve 32. A directional control valve 33 is connected between the solenoid valve 32 and the source of pressurized air 31. Further, a flow control valve 34 is connected in parallel with the directional control valve 33 and provides a restricted flow path. The directional control valve 33 has a dog 33A adapted to engage the piston rod 26 of the shifting cylinder 24. When the piston rod 26 of the shifting cylinder 24 is extended as shown by the broken line in FIG. 3, the dog 33A of the valve 33 is engaged by the piston rod 26 so that the directional control valve 33 will be shifted from the illustrated position in which the cylinder 19 is connected directly to the source of pressurized fluid 31 to a position in which the flow of pressurized fluid is directed from the source 31 to the flow control valve 34 for providing a restricted flow path. When the dog 33A is disengaged by the piston rod 26, the directional control valve 33 is automatically returned to the illustrated position to connect the cylinder 19 directly to the source of pressurized fluid 31. As well known in the art, the extension and retraction of the piston rod 28 in the cylinder 19 can be controlled by actuating the solenoid valve 32.

When the mold cavity is opened by separating the mold halves 13 after completion of molding, the removal and discharge cylinder 19 is vertically positioned above the mold cavity. The cylinder 19 is then actuated to extend the piston rod 28 toward the mold cavity and to remove a molded part from the mold cavity by the use of the chuck mechanism 29. Thereafter, the piston rod 28 is retracted to move the chuck mechanism 29 with the molded part grasped toward the illustrated position shown by the solid line in FIGS. 1 and 2. Next, the shifting cylinder 24 is actuated to extend the piston rod 26 thereof so that the holder 22 and thus the cylinder 19 will be shifted to the discharge position shown by the broken line in FIG. 1. At this time, the piston rod 26 of the shifting cylinder 24 initially engages the dog 33A of the directional control valve 33. Therefore, the above movements of the cylinder 19 are effected at relatively high speed since the directional control valve 33 is in the illustrated position to connect the pressure chamber 19A or 19B directly to the source of pressurized fluid 31. However, when the dog 33A of the directional control valve 33 is engaged by the piston rod 26 of the shifting cylinder 24, the directional control valve 33 is shifted to the position in which the flow of pressurized fluid is directed to the flow control valve 34 for providing a restricted flow path. In such a situation, when the cylinder 19 is actuated to extend the piston rod 28 thereof, the latter is moved toward the unloading location at relatively low speed since the flow of pressurized fluid from the source 31 is restricted by the flow control valve 34. Consequently, the chuck mechanism 29 is gently moved toward the unloading location so that the molded part grasped by the chuck mechanism 29 can be placed positively and exactly on the unloading location without any vibration as in the prior art.

The speed at which the cylinder 19 is actuated to extend the piston rod thereof toward the unloading location can be controlled by adjusting the flow control valve 34.

Although the preferred embodiment of the present invention has been described with reference to the accompanying drawings, it is to be understood that many modifications and changes can be made by those skilled in the art without departing from the spirit and scope of the invention as defined in the appended claims. For example, the present invention is applicable to a swingable, double-acting, fluid-operated cylinder for removing and discharging molded parts which is shifted transversely while it is being held at its vertical position without any pivotal movement.

I claim:

1. An injection molding machine comprising:
   a stationary machine portion,
   double-acting, fluid-operated cylinder means mounted vertically on the stationary machine portion and adapted to be moved between a removal position in which a molded part can be removed from the mold and a discharge position in which the molded part can be placed on a preselected unloading location, said cylinder means having a piston rod which has a chuck mechanism mounted thereon for grasping the molded part,
   means for shifting said cylinder means between said removal and discharge positions,
   a source of pressurized fluid for actuating said cylinder means to extend and retract said position rod, and
   a control circuit coupling said cylinder means directly to said source of pressurized fluid to move said piston rod at higher speed when said cylinder means is in said removal position and for connecting said cylinder means to said source of pressurized fluid through a restricted flow path to move said piston rod at lower speed when said cylinder means is in said discharge position.

2. The injection molding machine as defined in claim 1 wherein said control circuit comprises a directional control valve coupled between said cylinder means and said source of pressurized fluid and a flow control valve coupled in parallel with said directional control valve for providing said restricted flow path, said directional control valve being adapted to be shifted between a position in which said cylinder means is connected directly to said source of pressurized fluid and another position in which the flow of pressurized fluid is directed from said source to said flow control valve.

3. The injection molding machine as defined in claim 2 wherein said directional control valve is shifted between said positions be said means for shifting said cylinder means.

4. The injection molding machine as defined in claim 2 or 3, wherein said means for shifting said cylinder means includes another double-acting, fluid-operated cylinder means having a piston rod, said piston rod of said another cylinder means being adapted to shift said directional control valve into said position in which the flow of pressurized fluid is directed from said source to said flow control valve when said first-mentioned cylinder means is shifted to said discharge position by means of said another cylinder means.

* * * * *